United States Patent [19]

Ott et al.

[11] Patent Number: 5,670,572

[45] Date of Patent: Sep. 23, 1997

[54] IMPREGNATING RESINS FOR FILMS AND EDGINGS

[75] Inventors: Jürgen Ott, Bad Vilbel; Manfred Schön, Rodgau; Wilhelm Adam, Neu-Isenburg; Frank Scholl, Neuberg; Alfons Wolf, Seligenstadt, all of Germany

[73] Assignee: Hoechst Aktiengesellschaft, Germany

[21] Appl. No.: 552,726

[22] Filed: Nov. 3, 1995

[30] Foreign Application Priority Data

Nov. 4, 1994 [DE] Germany ............... 44 39 156.0

[51] Int. Cl.⁶ ............... C08K 5/05; C09J 161/32
[52] U.S. Cl. ............... 524/720; 427/342; 427/391; 427/393.2; 427/395; 428/264; 428/274; 428/278; 524/843; 524/877
[58] Field of Search ............... 524/195, 720, 524/843, 877, 100; 427/342, 391, 393.2, 395; 428/264, 274, 278; 525/509

[56] References Cited

U.S. PATENT DOCUMENTS

| | | | |
|---|---|---|---|
| 2,385,766 | 9/1945 | Thurston | 428/278 |
| 2,927,090 | 3/1960 | Hiestand et al. | 428/278 |
| 3,023,176 | 2/1962 | Hiestand | 428/278 |
| 3,050,419 | 8/1962 | Ruperti | 428/278 |
| 3,311,496 | 3/1967 | Van Loo | 428/278 |
| 3,496,131 | 2/1970 | Bornmann et al. | 524/843 |
| 4,361,594 | 11/1982 | Winterbottom | |

FOREIGN PATENT DOCUMENTS

| | | |
|---|---|---|
| 0 028 204 | 5/1981 | European Pat. Off. . |
| 0 268 809 | 6/1988 | European Pat. Off. . |
| 0 561 432 | 9/1993 | European Pat. Off. . |
| 2 586 023 | 2/1987 | France . |
| 1 619 243 | 3/1971 | Germany . |
| 26 55 924 | 6/1978 | Germany . |
| 70 29 516 | 9/1970 | Japan . |
| 52-5894 | 1/1977 | Japan . |
| 59 109 344 | 12/1982 | Japan . |
| 05 202 270 | 8/1993 | Japan . |
| 867981 | 5/1961 | United Kingdom . |
| 2 180 545 | 4/1987 | United Kingdom . |

OTHER PUBLICATIONS

Chemical Abstracts, vol. 89, No. 24, Dec. 11, 1978, abstract No. 198402m.

Chemical Abstracts, vol. 74, No. 2, Jan. 11, 1971, abstract No. 4259s.

Chemical Abstracts, vol. 101, No. 14, Oct. 1, 1984, abstract No. 112181v.

Japan Plastic Age, Bd. 11, Nr. 7, 1973 "Benzoguanamine in Molding Applications Part 1 Tableware".

Kunstoffe, Bd. 69, Nr. 5, 1979, pp. 263–265, "Herstellung nachverformbarer dekorativer Schichtstoffplatten mit Hilfe von Acetoguanamin".

Chemical Abstracts, vol. 119, No. 26, Dec. 27, 1993, abstract No. 272671e.

*Primary Examiner*—Veronica P. Hoke
*Attorney, Agent, or Firm*—Connolly & Hutz

[57] ABSTRACT

The present invention relates to melamine-formaldehyde resins comprising a guanamine, to processes for their preparation and to their use for the production of melamine resin films and edgings.

12 Claims, No Drawings

IMPREGNATING RESINS FOR FILMS AND EDGINGS

The present invention relates to melamine-formaldehyde impregnating resins comprising a guanamine, to processes for their preparation and to their use.

According to the conventional working procedure, films and edging materials for coating wooden materials which are based on paper, non-wovens or woven fabrics are produced by impregnation with urea resins in aqueous solutions and drying of the impregnated materials, if appropriate with the addition of polymer dispersions for elastification.

Because of the high swelling of cellulose in aqueous systems, these films and edgings are brittle, have a high absorption of water and have a surface which visually is not very attractive in the coated state.

It is known from DE-A 23 09 334 to employ etherified methylolmelamines from ($C_1$–$C_4$)-alcoholic impregnating liquors. By suppressing the swelling of cellulose, visually more favourable surfaces having improved flexibilities are obtained, but these do not meet the requirements of processing by soft shaping. The process also requires further measures for treatment of the waste gas if ($C_1$–$C_4$)-alcohols are employed. According to EP-B 0 268 809 and EP 0 342 386, processes are known, inter alia, which dispense with the use of lower alcohols as solvents or water when processing etherified melamine resins for impregnation of paper, non-wovens or woven fabrics for the production of films and edging materials.

The penetration properties required of the resins for the impregnation are achieved by addition or incorporation of, for example, polyhydric hydrophilic alcohols.

Because of their hydrophilic modification, products of such a type still have a high absorption of water on the substrate, especially in the case of processing by soft shaping.

It has now been found that this disadvantage can be eliminated by addition of guanamines, with otherwise the same advantageous properties.

The present invention thus relates to aqueous melamine-formaldehyde resins, characterized in that they comprise a guanamine.

The guanamines have, in particular, the general formula I

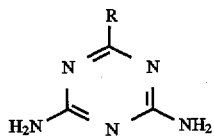

I wherein R is hydrogen, ($C_1$–$C_{20}$)-alkyl, ($C_6$–$C_{14}$)-aryl or ($C_6$–$C_{14}$)-aryl -($C_1$–$C_6$)-alkyl.

Preferred guanamines are benzoguanamine and ($C_5$–$C_{17}$)-alkylguanamines, in particular caprinoguanamine.

The resins according to the invention can comprise the guanamine in co-condensed form or merely be a mixture of a melamine-formaldehyde resin with a guanamine. Resins which comprise both co-condensed and merely admixed guanamine are of course also to be included.

The molar ratio of melamine:guanamine:formaldehyde in the resins according to the invention is, in particular, 1:(0.001 to 0.5):(1.3 to 6).

The condensates mentioned can optionally be at least partly etherified with alcohols. Suitable alcohols are, in particular, ($C_1$–$C_4$)-alcohols, for example methanol and butanol.

The molar ratio of melamine:alcohol here is preferably 1:(0.8 to 6).

The resins according to the invention have, for example, solids contents of 60 to 85, preferably 65 to 80, particularly preferably 70 to 78% by weight.

The resins according to the invention can be prepared in a manner known per se, for example by reacting, for example, melamine and the guanamine with formaldehyde, optionally then carrying out an etherification with a ($C_1$–$C_4$)-alcohol and adjusting the resulting product to the desired solids content.

However, the reaction with formaldehyde can also be carried out directly in the presence of the alcohols mentioned.

The guanamine used for preparation of the resin can be added during or before the condensation reaction. If desired, however, a precondensate prepared in a known manner can also be used.

The resins according to the invention can be used for the production of melamine resin films and edgings. For this, they are applied to one or both sides of papers, cellulose non-wovens or cellulose webs with a weight of, for example, 40 to 350 g/m² and are then dried.

This application end drying is carried out in a manner known per se such that the impregnated carrier web comprises 15 to 60% by weight, preferably 20 to 50% by weight, of solid resin based on its final weight. The drying which follows the application is usually carried out at a temperature of 110° to 200° C., preferably 140° to 180° C., on known devices, for example in drying chambers or drying tunnels (suspension driers). The residual moisture content of the films and edgings produced is usually 1 to 5% by weight (as the weight difference after 5 minutes at 160° C.).

The resins according to the invention can comprise auxiliaries and additional agents, in particular the customary additives. Such additives are, for example, wetting agents, such as fatty alcohol ethoxylates or alkylphenol ethoxylates, aqueous dispersion of polymers and copolymers of acrylic and methacrylic acid esters or substances which improve penetration, in particular polyhydric alcohols.

Acid catalysts which are known per se can likewise be employed in the use according to the invention, in order to achieve rapid curing of the resin according to the invention during subsequent drying.

Examples of possible suitable acid catalysts are ammonium and amine salts, particularly preferably of p-toluenesulphonic acid, or p-toluenesulphonic acid itself.

To achieve a better flexibility of the impregnated materials produced, polyvinyl acetate dispersions, water-soluble alkyd resins or acrylate dispersions, for example, can also be added to the resin solutions.

The impregnating resins according to the invention are applied to the carrier material, which can be effected, for example, by rolling on, knife-coating on or spraying on or via an impregnating process.

The resulting resin-treated carrier webs are suitable both for coating areas and, in particular, for coating edgings and, with an excellent resistance to moisture, also meet the requirements imposed on soft edgings. They display an excellent elasticity and flexibility, measured by the bending test, for example with a radius of 5 mm, with simultaneous good spanning properties and a low tendency to split.

EXAMPLE 1

392.1 g (5.11 mol) of aqueous 39% strength formaldehyde are initially introduced into a 2 l multi-necked glass with a stirrer, thermometer, pH meter and reflux condenser and are heated to 68° C.

After addition of 1.7 ml of 2N sodium hydroxide solution, 225 g (1.79 mol ) of melamine and 5 g (0.021 mol) of chemically pure capriguanamine, the mixture is kept at 830° C. somewhat longer than necessary to achieve a solution.

After cooling to 55° C., 1404 ml (34.66 mol) of methanol and 2.0 ml of 53% strength nitric acid are added and the mixture is etherified at 59° C., until a clear solution is obtained. The pH is brought to 9.8 and the low-boiling solvents are removed under a waterpump vacuum. The solids content (2 g, 1 hour at 120° C., aluminum dish) is then brought to 72.6% with water.

The resin shows a flow time of 63 seconds (DIN 4 mm cup/23° C.) and water-dilutability of 1:1.2. The storage life is more than 3 months.

EXAMPLES 2–4

These examples correspond to Example 1, with the difference that 230 g (1.83 mol) of melamine are employed with 4 g (0.0168 mol) (Example 2), with 3 g (0.0126 mol) (Example 3) or with 2.5 g (0.0105 mol) of caprinoguanamine (Example 4).

EXAMPLE 5

Example 1 is repeated using capriguanamine of technical grade quality. The flow time at a solids content of 72.5% (2 g 1 hour at 120° C., aluminum dish) is 83 seconds (DIN 4 mm cup/23° C.). The water-dilutability at 20° C. is 1:0.8.

EXAMPLES 6 to 9

In Examples 6 to 9, 230 g (1.83 mol) of melamine are used with varying amounts of caprinoguanamine analogously to Example 5, in Example 6: 4 g (0.0168 mol), in Example 7: 3 g (0.0126 mol), in Example 8: 2 g (0.0084 mol) and in Example 9: 1 g (0.0042 mol).

EXAMPLES 10 and 11

A resin is prepared completely analogously to Example 5, but 355 g (4.63 mol) (Example 10) or 345 g (4.50 mol) (Example 11) of 39% strength formaldehyde are employed.

EXAMPLES 12 and 13

The resins are prepared according to Example 10, but 4 g (0.0168 mol ) (Example 12) or 3 g (0.0126 mol) of capriguanamine (Example 13) are used.

EXAMPLE 14

In contrast to Example 5, the capriguanamine is added before the formaldehyde is heated up. A resin solution having a solids content of 72.5% (2 g, 1 hour at 120° C., aluminium dish) and a flow time of 58 seconds (DIN 4 mm cup/23° C.) is obtained.

EXAMPLE 15

392.1 g (5.11 mol) of aqueous 39% strength formaldehyde are initially introduced into a 2 l multi-necked flask with a stirrer, thermometer, pH meter and reflux condenser and are heated to 68° C. After addition of 1.7 ml of 2N sodium hydroxide solution, 200 g (1.59 mol) of melamine and 40 g (0.214 mol) of benzoguanamine, the mixture is kept at 83° C. for somewhat longer than required to dissolve the solids. After cooling to 55° C., 1404 ml (34.66 mol) of methanol and 2.0 ml of 53% strength nitric acid are added and etherification is carried out at 59° C. until a clear solution is obtained. The pH is brought to 9.8 and the low-boiling solvents are removed under a waterpump vacuum. The solids content is then brought to 72.9% (2 g, 1 hour at 120° C., aluminium dish) with water. The resin shows a flow time of 53 seconds (DIN 4 mm cup/23° C.) and a water-dilutability at 20° C. of greater than 1:50. The isopropanol-dilutability at 20° C. is 1:9.

EXAMPLES 16 to 19

These examples correspond to Example 15, with the difference that different amounts of melamine and benzoguanamine were employed in the preparation. 230 g (1.83 mol) of melamine and 5 g (0.027 mol) of benzoguanamine were used in Example 16, in Example 17: 220 g (1.75 mol) of melamine and 20 g (0.107 mol) of benzoguanamine were used, in Example 18: 180 g (1.43 mol) of melamine and 60 g (0.321 mol) of benzoguanamine were used and in Example 19: 180 g (1.43 mol) of melamine and 90 g (0.481 mol) of benzoguanamine were used.

EXAMPLE 20

In this example, the benzoguanamine is added before the formaldehyde is heated, in contrast to Example 15.

EXAMPLE 21

230 g (1.83 mol) of melamine, 60 g (0.321 mol) of benzoguanamine and 355 g (4.63 mol) of 39% strength formaldehyde are reacted completely analogously to Example 15. The colourless resin has a solids content of 72.8% (2 g, 1 hour at 120° C., aluminium dish) and a flow time of 105 seconds (DIN 4 mm cup/23° C.).

Comparison Example:

The procedure is as in Example 1, with 230 g (1.83 mol) of melamine, without metering of guanamine.

Use Examples:

75% strength PEG 400 in water is added to each of the condensates obtained in a weight ratio of 75:25 . Low-viscosity impregnating resins having excellent impregnating properties on paper, non-wovens or woven fabrics are obtained by this procedure.

2% of p-toluenesulphonic acid in the form of a 40% strength aqueous solution and 0.5% of Hypersal XT 793, in each case calculated with respect to the solid resin, are added to the impregnating resins prepared in Examples 6 to 9 and 15 to 19 and in the comparison example, and the impregnating liquor thus obtained is applied by knife-coating to an edging card of 200 g/m$^2$ weight per unit area. The impregnated material is then dried at 160° C. in circulating air.

The following results were obtained:

| Example No. | Viscosity of impregnating liquor DIN 4 mm [s] | Penetration on the substrate 23° C. [s] | Resin content of the impregnated material [%] | VC 160° C. | Water [%] | Drop time [min] | Mandrel bending test Room temp. | Mandrel bending test 2.5 mm 160° C. | Bending test longitudinal [Nmm] | Bending test transverse [NmM] |
|---|---|---|---|---|---|---|---|---|---|---|
| 6 | 25 | 19 | 34.2 | 2.0 | 15.7 | >120 | 120 | >180 | 18 | 14 |
| 7 | 27 | 15 | 33.4 | 2.1 | 16.2 | >120 | 110 | 120 | 19 | 13 |
| 8 | 25 | 13 | 35.1 | 2.3 | 20.6 | 95–115 | 115 | >180 | 22 | 16 |
| 9 | 24 | 12 | 34.9 | 2.7 | 22.4 | 73–82 | 115 | >180 | 20 | 15 |
| 15 | 30 | 20 | 34.8 | 2.2 | 17.8 | >120 | 80 | 120 | 13 | 10 |
| 16 | 33 | 17.5 | 35.2 | 3.1 | 29.8 | — | 80 | >180 | — | — |
| 17 | 28 | 15 | 34.9 | 2.6 | 23.1 | 95–108 | 95 | 100 | 15 | 11 |
| 18 | 29 | 14 | 35.2 | 2.7 | 14.1 | >120 | 110 | 100 | 16 | 10 |
| 19 | 29 | 19 | 35.0 | 2.5 | 17.5 | >120 | 100 | >180 | 16 | 11 |
| Comparison Example | 38 | 24 | 33.4 | 1.8 | 25.8 | 39–60 | about 90 | about 140 | about 16 | about 12 |

VC = Volatile Content

We claim:
1. Modified aqueous melamine-formaldehyde resins selected from the group consisting of
   a. melamine-formaldehyde resins which contain at least one guanamine in co-condensed form;
   b. mixtures of at least two resins of group (a);
   c. mixtures of at least one melamine-formaldehyde resin with at least one guanamine;
   d. mixtures of at least one resin of group (a) and a mixture of group (c);
   e. mixtures of at least one resin of group (a) and at least one guanamine;
wherein the guanamine is selected from 1-alkyl-3,5-diaminotriazines with 5 to 17 carbon atoms in the alkyl group, and wherein the modified melamine-formaldehyde resins are aqueous melamine-formaldehyde impregnating solutions which are at least partially etherified with a $C_1$–$C_4$ alcohol, the molar ratio of alcohol to melamine in the alkoxymethyl melamine being from 0.8:1 to 6:1 and the resin has a solids content of about 60 to about 85% by weight and the molar ratio of melamine:guanamine:formaldehyde is about 1:(about 0.001 to about 0.5):(about 1.3 to about 6).

2. The resin according to claim 1, wherein said guanamine is caprinoguanamine.

3. The resin according to claim 1, wherein the molar ratio of melamine:guanamine:formaldehyde is about 1:(about 0.001 to about 0.5):(about 1.3 to about 6).

4. The resin according to claim 2, wherein the resin has a solid content of about 65 to about 80.

5. The resin according to claim 1, wherein the resin has a solid content of about 70 to about 78.

6. A method of producing a melamine resin film or edging comprising applying the resin as claimed in claim 1 to at least one side of a paper, cellulose non-woven material or cellulose web to form an impregnated carrier and then drying said impregnated carrier.

7. The method as claimed in claim 6, wherein said resin is applied in a total amount from about 40 to about 350 g/m².

8. The method as claimed in claim 6, wherein said resin is applied to both sides of said paper, cellulose non-woven material or cellulose web.

9. The method as claimed in claim 8, wherein said resin is applied in a total amount from about 40 to about 350 g/m².

10. The method as claimed in claim 6, wherein said drying is carried out at a temperature from about 110° to about 200° C. and said impregnating carrier comprises about 15 to about 60% by weight of solid resin based on its final weight.

11. The method as claimed in claim 10, wherein said drying is carried out at a temperature from about 140° to about 180° C. and said impregnating carrier comprises about 20 to about 50% by weight of solid resin based on its final weight.

12. A melamine resin film or edging comprising a resin according to claim 1, applied to a least one side of a paper, cellulose non-woven material or cellulose web.

* * * * *